United States Patent [19]
Dean

[11] Patent Number: 5,406,019
[45] Date of Patent: Apr. 11, 1995

[54] OIL SPILL RECOVERY SYSTEM

[76] Inventor: Miles W. Dean, 133 W. 24th #5, Anchorage, Ak. 99501

[21] Appl. No.: 5,900

[22] Filed: Jan. 15, 1993

[51] Int. Cl.$^6$ .......................... B09B 3/00; A62D 3/00
[52] U.S. Cl. ................................... 588/249; 405/128; 405/60
[58] Field of Search ............... 405/263, 264, 258, 128, 405/60, 63–72; 210/702, 703, 747; 588/249

[56] References Cited

U.S. PATENT DOCUMENTS

| | | | |
|---|---|---|---|
| 3,800,950 | 4/1974 | Hess et al. | |
| 4,222,868 | 9/1980 | Kuris. | |
| 4,401,475 | 8/1983 | Ericksson. | |
| 4,492,001 | 1/1985 | Hedrenius. | |
| 4,758,355 | 7/1988 | Levine | 405/263 X |
| 4,839,061 | 6/1989 | Manchak, Jr. et al. | 405/264 X |
| 4,952,242 | 8/1990 | Earp | 405/128 X |
| 4,992,213 | 2/1991 | Mallet. | |
| 5,008,019 | 4/1991 | Trost | 405/263 X |
| 5,011,330 | 4/1991 | Kittle et al. | 405/263 X |
| 5,049,002 | 9/1991 | Cole | 405/128 |
| 5,059,252 | 10/1991 | Renfro, Jr. | |
| 5,076,919 | 12/1991 | Francisco, Jr. | |
| 5,103,910 | 4/1992 | Chan | 405/264 X |
| 5,234,485 | 8/1993 | Bölsing | 405/263 X |

OTHER PUBLICATIONS

The Hotsy Corporation Brochure: "Cold Water Pressure Washers".
Paper for Presentation entitled "A Process to Remove and Recover Spilled Oil from Surfaces & Materials in the Artic", prepared by Lyle D. Perrigo, II, S. V. Cuccarese and Lyle D. Perrigo, III, and presented by Wade B. Talkington at POLARTECH '92 on Jan. 21, 1992.

*Primary Examiner*—Dennis L. Taylor
*Attorney, Agent, or Firm*—John R. Kirk, Jr.; Jenkins & Gilchrist

[57] ABSTRACT

The present invention is used in response to petroleum related spills in the environment. The hydrocarbon materials can be removed from any substrate, particularly ice or beach sand, by impinging in two separate fluid streams, a formable surfactant/emulsifying solution with a latent foaming agent and a foam inducing agent through specially designed variable pressure guns. Once treated, the petroleum-related liquids are lifted above the substrate in a foam matrix formed while the solution is in contact with the spilled contaminants, and captured via standard industrial vacuum technology for later disposal.

13 Claims, 2 Drawing Sheets

OIL SPILL RECOVERY SYSTEM

FIELD OF THE INVENTION

This invention relates to a method system for the rapid response to hydrocarbon contamination, particularly crude oil spills, of the environment. It involves a method for the onsite removal of hydrocarbon contamination, and the equipment and chemical mixture, used for minimizing the environmental damage.

BACKGROUND OF THE INVENTION

Even with the effort to avoid them, oil spills still occur to threaten sensitive environments. The use of super-tankers and off-shore drilling and remote terminals in geologically active areas serve to increase the damage when spills do occur. Massive oil spill disasters have been experienced in the last few years due to these activities.

Even with the heightened awareness leading to quick responses, prior art techniques available for controlling and removing oil slicks from surface waters and adjacent coastlines are unsatisfactory. Dispersants and detergents are taught to be effective in household cleaners for dispersing oil from surfaces in U.S. Pat. No. 4,992,213 in other environments. Various absorbent materials have been proposed to be applied to the slick to remove or sink the oil to the bottom of the body of water as described in U.S. Pat. Nos. 4,401,475, 4,492,001 and 3,800,950, for example. This treatment always involved the pickup of the absorbent and the oil, resulting in a double clean-up disposal.

As described in U.S. Pat. No. 4,492,001, the method involved in response system whereby absorbent materials are spread on a contaminated area, such as a beach, to absorb the spill, and then is sucked by a vacuum, either through the same nozzle or another nozzle, to a container wherein it is removed from the environment. While effective in some instances, it remains ineffective for the more difficult clean-up jobs relying upon the mechanical contact of absorbent materials with the contaminating spill. In U.S. Pat. No. 3,800,950, the removal of an oil slick is described wherein an open cell material such as polystyrene is broadcast upon an oil slick and scooped up by a modified scow. The patent describes the foaming of the polystyrene in the well known popcorn manner. This foam itself is broadcast on the surface to absorb the oil slick.

Another technique utilizes a treated silica which will act as a wick and permit burning of an oil slick, particularly on water. In situ burning of the spilled hydrocarbon has been an institutionally acceptable, but ineffective, solution in the arctic regions, but it is dangerous, especially in the presence of a natural gas leak. For these and other reasons, the hydrocarbon contaminations have been mainly controlled by very primitive methods such as by skimming with pumps, by manually collecting the oil with shovels and rakes, by washing rocky shorelines with high-pressure hot water hoses, and by coagulating the oil with straw which is then removed and burned. Attempts have been made to corral oil slicks with ultrasonic sound as described in U.S. Pat. No. 4,222,868, which also describes many other vain attempts.

Nowhere was the failure of these prior art techniques more evident than in the response to the 1990 Exxon Valdez spill off the coast of Prince William Sound in Alaska. All then existing techniques of oil spill remediation were considered for the job and were either rejected or proved to be futile. Not only was there an absence of effective methods to remove the oil on an emergency response basis, but there was also no effective method for the ultimate clean-up of the spillage from the sea or the coast. The total damage may not be known for years, if ever.

Removal of an accidental oil spill from water surfaces or land areas has long been, and will continue to be, a serious problem associated with the production and transportation of oil, and is also a vital enterprise. Although various mechanical devices have been designed to remove oil spread on the surface water, the number of safe methods for removal of oil from land has been limited. Statistics show that only about 10% of the oil spilled is recovered using the best technology available. In such a situation, it is particularly important to preserve the ecological balance, so as not to destroy living organisms while cleaning oil contamination. Not only are crude oil and petroleum product spills a problem, the environment is also contaminated with many hydrocarbon based hazardous materials which were previously in wide use throughout the world, such as diesel fuels, creosote, dioxins, furans and polychlorinated phenols.

The relative importance of an efficient, cost-effective, and environmentally-sound process and equipment for removing and recovering spilled oil or removing oil from contaminated soils is nowhere more crucial than in the hostile environment of the polar regions where any activity is hampered by extreme temperatures which affect all fluids, including any materials used for cleanup as well as the spilled contaminant. Traditional beliefs about the fragility of the environment, substantial experience with the high-costs of commercial and industrial operations, variable as well as extreme weather conditions, and tenuous logistics place added emphasis on the need for processes and equipment that are efficient, relatively fast, and economically competitive. Until now, these have been missing.

Other recovery methods and equipment are disclosed in U.S. Pat. Nos. 5,076,919; 5,059,252; and 4,758,355, for example. Few problems have received the attention that hydrocarbon contamination has. Yet, the problem remains, but the practice of the instant invention serves to provide another tool to the continuing battle.

SUMMARY OF THE INVENTION

The present invention employs a foamable surfactant mixture as an agent in a method of application and recovery which emulsifies spilled petroleum crude or similar products and lifts them to the surface of the contaminated substrate in a temporary foam matrix. Once trapped in the foam, the petroleum is recovered by conventional industrial vacuum technology. Spilled oil recovery efficiencies routinely exceed 90%. The chemical mixture is equally efficient on substrates such as beach sand, cobble tundra, soil, water and ice. Furthermore, the chemical mixture is environmentally benign and does not materially adulterate the recovered oil, thus allowing it to be recycled. As a particular advantage, the oil spill recovery system of the present invention is easily and rapidly deployed on an emergency response basis and is economically competitive with other oil spill remediation technologies.

BRIEF DESCRIPTION OF THE DRAWINGS

The accompanying drawings, which are incorporated in and form a part of the specification, illustrate the embodiments of the present invention, and, together with the description, serve to explain the principles of the invention. In the drawings:

FIG. 1 is a schematic diagram showing the important parts of the oil spill recovery system of the present invention, while omitting common gauges, valves and the like.

DETAILED DESCRIPTION OF THE INVENTION

Oil spills on water and around beach areas have created many problems. For instance, an oil spill on a water surface is a fire hazard, a danger to wildlife, and a nuisance at public beaches and recreation areas. Much work has been done in recent years in an effort to clean up oil spills.

Towards that end, the present invention is used for prompt response to petroleum related spills in the environment. Hydrocarbon materials can be removed virtually from any substrate, particularly ice, by impinging in two separate fluid streams, a first solution containing a foaming surfactant/emulsifier and a latent foam inducing agent, and a second stream containing an activator for the foaming agent; both through specially designed variable pressure guns having a barrel and nozzles. Once treated, the contaminating liquids are lifted above the substrate, trapped in a foam matrix formed while the solution is in contact with the spilled contaminants, and captured via standard industrial vacuum technology for later disposal or separation. The inert foam dissipates on its own within about twenty minutes depending on the environmental conditions. This process can be speeded, if desired. Tests performed on substrates ranging from sand, to gravel cobbles, to ice, show recovery rates for the process well in excess of 90%.

In one embodiment of the invention, the foaming surfactant is applied to the hydrocarbon covered substrate prior to the introduction of the activator for the foam creating agent. This allows the hydrocarbon to be captured to be soaked with the foaming surfactant, thus reducing the viscosity of the material to be removed. The surfactant is then contacted with the foam activator, thus trapping the contaminants in the foam matrix prior to removal by vacuum.

Chemical analysis of the treated crude oils show that the present process does not materially adulterate the petroleum, thereby allowing it to be recycled if economic conditions warrant. Furthermore, toxicity testing of the surfactant/emulsifying solution and foam inducing agent exceeded federal requirements and showed that the chemical mixture used in the present process to be remarkably benign to the environment.

Figure 1:
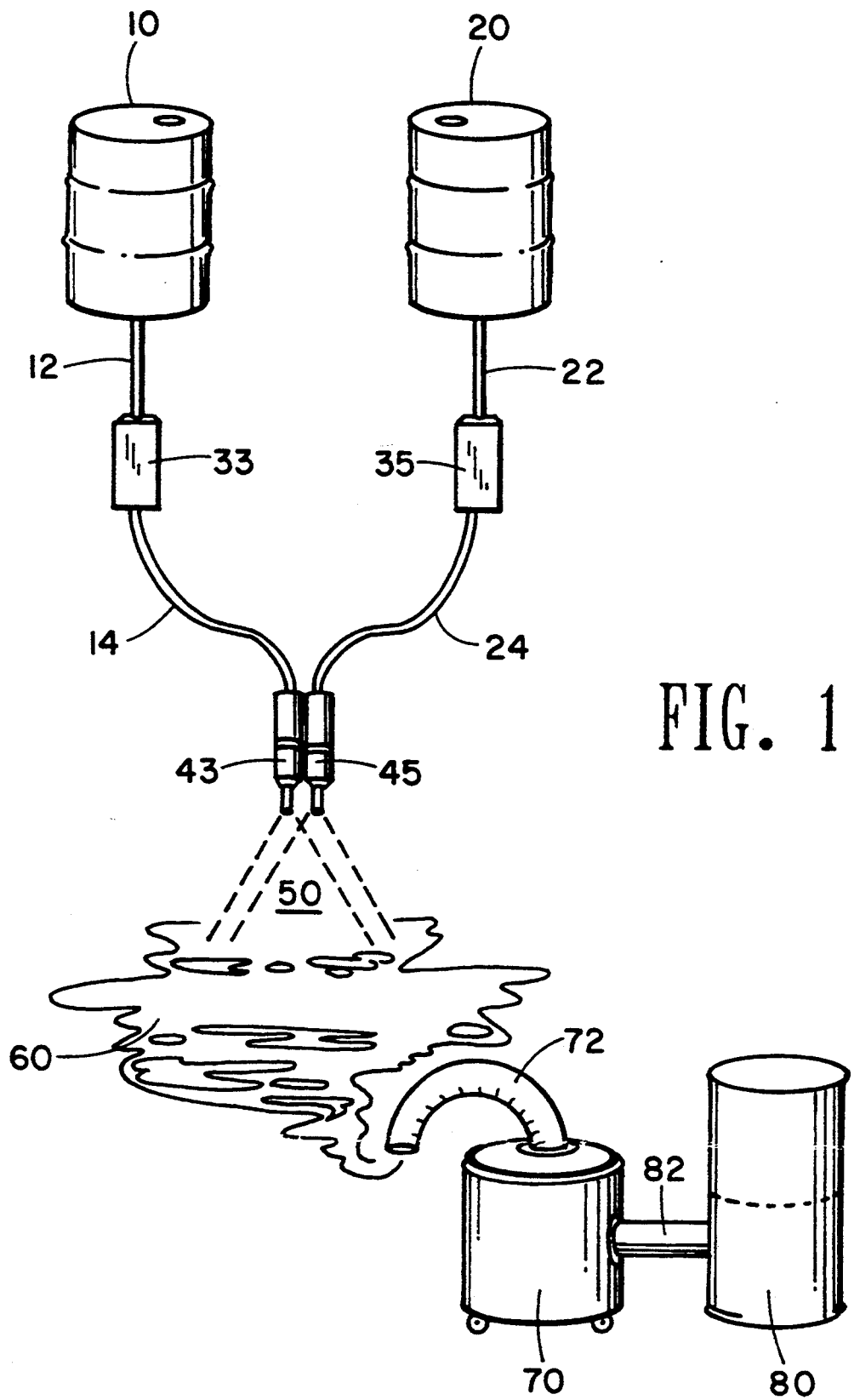

The basic elements of the equipment of the present invention is shown in FIG. 1 in a schematic diagram. This schematic diagram is not intended to show the well known parts of pumping an application system such as valves, pumps, gauges, meters and the like. The schematic presentation shown in FIG. 1 is presented to exemplify the necessary elements for the ready response environmental clean-up equipment of the present invention. It should be recognized in considering the description which follows that this equipment may be truck mounted on a modified, commonly available, vacuum truck, well known in the waste and remediation industry. It could also be appropriately mounted on one or more skid platforms for quick delivery to remote pipeline or production areas. A small unit could be skid mounted to include diesel or gasoline engines carrying their own fuel as well as the tanks to be described later, with all of the equipment operating from skid mounted power, including the vacuum removal device to be described later. In accomplishing the ready response in remote areas, bladder-type neoprene tanks could be carried for storage of the contaminants removed from the earth, if desired. While having its applicability particularly in the hostile areas of frozen arctic regions, the equipment and methods of the present invention are equally at home in the steamy,wet jungles of the equator or the desert, sandy regions of the middle east oil producing countries.

Two chemical holding tanks 10 and 20 are used to store the two principal components of the present invention. Holding tank 10 contains and acts as a source of the foaming surfactant and latent foaming agent, collectively called Component A, which composition will be discussed more fully below. Holding tank 20 contains the activator for the latent foaming agent, usually in an aqueous solution for convenience, called Component B. Likewise, the composition of Component B will be discussed more fully below. Component A travels from holding tank 10 through line 12 to a pump 33. The pump 33, which may be powered by either an electric or gas motor with appropriate gearing, or other suitable pump, is used to deliver Component A to the spray gun 43 through line 14.

In a similar fashion, Component B travels through line 22 from the holding tank 20 to the pump 35. Pump 35 delivers Component B to the spray gun 45 through line 24. A suitable solution delivery system can be made from a modified portable commercial carwash unit such as those available from Hotsy Corporation of Englewood, Colorado, including spray guns 43 and 45, fitted with micro switch triggers. The guns will be discussed in more detail with respect to FIGS. 2A through 2C.

Separate triggers on each gun allow the operator to control the times of application and relative mix of Component A and Component B being applied to the contaminated substrate. In FIG. 1, there is shown an overlapping fan type spray 50 applied to the oil spill 60. The two components emulsify the spilled petroleum 60, produces a foam trapping the contaminant, and lifting it above the surface in a temporary foam matrix. While trapped in the foam, the petroleum is recovered by conventional industrial vacuum apparatus 70 through vacuum hose 72. If desired, the recovered oil in the vacuum 70 may be transferred to a product separation tank 80 through line 82. There the foam collapses, either naturally or through addition of known defoamers.

Thus, the volume of contaminated material is very small as compared with prior art sorbent foams and pads which still must be dealt with. In the practice of this invention well known emulsion breaking and oil/water separation technology would be practical for ultimate clean-up. The volume which must be handled is, therefore, much less.

Application of the surfactant/emulsifying component and the foam inducing agent involves solution preparation in two separate systems of tanks and associated piping, heating the contents of those tanks, maintaining solution temperatures, using two high-pressure, positive displacement pumps to deliver the solutions to two spray nozzles and control systems, and operating the nozzles and controls to produce high velocity impingement of the chemicals on the surface of the spilled oil.

In general, the process involves the removal of spilled hydrocarbons from almost any substrate, including ice, by applying in two separate streams a surfactant solution (Component A) and a foam inducing solution (Component B). When a spill occurs, the two aqueous solutions are applied to the spill simultaneously through a specially modified pressure washing device such that the A Component and B Component mix in the area of the spill to induce the formation of a foam which lifts the contaminant from the surface and holds it in the foam until the foam can be removed by vacuum from the surface. Tests indicate considerable success in removing the petroleum-related liquids from surfaces such as beach sands, an ice cap or mixed ice and water. The substrate is left clean and the oil is trapped and recovered in the foam.

As a particular advantage, the manpower and cleaning agent costs for this process are economically competitive with a very small manpower requirement as opposed to many prior art attempts. The chemicals used to formulate the two components are relatively inexpensive and have an extended shelf life. Most importantly, however, are the cost considerations for the ultimate disposition of the cleaned sand, gravel, or water. Achieving the design criteria of this invention means that all of the materials need not be placed in specially permitted sites. Release to the environment of sand and gravel with less than 100 ppm of petroleum residues, for example, can be favorably contrasted with high disposal costs for waste drums in permitted land fills.

One solution which is, for sake of convenience only, called Component A is an aqueous foaming surfactant solution having a solids (surfactant mixture) content of from about 60% to about 85% by weight. This solution should be as concentrated as the choice of independent components and the environment in which it is to be applied will allow in order to produce a stable foam matrix. In the arctic cold, of course, it must be protected against freezing. Surfactants or surface-active agents are well known materials which have a molecular structure including a highly polar (hydrophilic) function located at one end of a long non-polar (hydrophobic) hydrocarbon chain which is sufficiently lyophilic to hold the oil contaminant during the matrix forming foaming of the surfactant. A foaming surfactant is a substance which alters the surface tension of water foam forming conditions while forming a foam matrix. There are traditionally three types of surfactants: non-ionic, anionic, and cationic. A fourth type which under certain conditions may be anionic or cationic is known as amphoteric.

The properties of surfactants are well known and many public studies have been made to discuss the various attributes of many of them. Manufacturers of the materials sold as surfactants are highly sophisticated, major research corporations who publish information and data relating to the oil gathering properties of the lyophilic portion of the molecules, as well as the hydrophilic portion, in large part formed by the addition of ethylene oxide to the oil loving detergent grade alcohol, usually having from about $C_6$ to about $C_{28}$, preferably from about $C_{12}$ to about $C_{18}$. These alcohols are either naturally occurring or manufactured through the limited polymerization of ethylene with subsequent reactions which produce basically primary (sold under "Alfol" trademark of Conoco) or secondary (sold under "Neodol" by Shell) linear alcohols. The criteria for the selection of the surfactant or surfactant mixtures making up component A in the practice of this invention is that they be susceptible to forming a foam under foam forming conditions; and second, that the oil loving portion of the molecule be such that the hydrocarbon being removed from the contaminated substrate be captured by the surfactant and swept up into the matrix of the foam. Preferably, the foam would remain stable for 20 minutes to an hour or for at least 20 minutes to allow time to remove foam and trapped oil. Surfactants are well known and generally fall into the category of nonionic, cationic and anionic surfactants with some amphoteric surfactants being applicable. The preferred surfactants useful in the practice are nonionic surfactants, or mixtures thereof.

Specific examples of nonionic surfactants useful in the present invention are compounds which are formed by reacting alkylphenols, particularly octylphenol or nonylphenol and other alkyl alcohol initiators with ethylene oxide. The average number of ethylene oxide molecules attached to each molecule of octylphenol or nonylphenol is normally between 1 and 12 ethylene oxide molecules per molecule octylphenol or nonylphenol depending upon the properties desired. The hydrophilic-lyophilic balance (or HLB, i.e., water loving-hydrocarbon loving, respectively) increases as the number of ethylene oxide molecules increase. A wide range of these surfactants are well known and available on the market. Other nonionic surfactants may include ethylene oxide adducts of fatty acids, amines or other substances and their derivatives. Similarly, commercially produced linear or branched alcohols in the detergent range, i.e., from $C_6$-$C_{28}$ alcohols, are useful when reacted with ethylene oxide according to well known processes and procedures. Preferably, the $C_8$-$C_{12}$ alcohols or $C_9$-$C_{13}$ alcohols reacted with an average of from about 6 to about 10 molecules ethylene oxide are preferred.

Specific cationic surfactants which can be tested and considered for use in this oil spill recovery system are liquids well known and widely available formed from the quaternary ammonium chloride derivatives of polypropoxy tertiary amines. As long as the criteria of foamability and the capture of the oil in the spill are satisfactory.

The molecular weight of these surfactants depends on the hydrocarbon constituents in the molecules. Molecular weights of these compounds are generally between 600 and 2500. It is well known that the water solubility decreases as the molecular weight of the molecule increases.

Other cationic surfactants may include aliphatic (fatty) amines and their derivatives, homologues of aromatic amines having fatty acid constituents, fatty amides derived from disubstituted amines, quaternary ammonium compounds, amides derived from amino alcohols and their quaternary ammonium derivatives, quaternary ammonium bases derived from fatty amides of disubstituted diamines, basic compounds of sulfonium, phosphonium, and antimonium, dimethylphenylbenzyl ammonium chloride, urethanes or basic salts of ethylene diamine, polyethylene diamines and their quaternary ammonium derivatives, polypropanol polyethanolamines and various cationic-active compounds.

Anionic surfactants for consideration may include products obtained by direct sulfonation of fatty acids without previous treatment, products obtained by esterification of fatty acids with sulfonated monovalent alcohols, sulfonated derivatives of fatty acid esters of low molecular weight, sulfonated products of fatty amides, products obtained by condensation of fatty acid chlorides with amines, sulfonation products of fatty acid nitriles or aldehydes of ketones or other natural or synthetic alcohols, products obtained by use of mineral esterification agents other than sulfuric acid and sulfonated aromatic compounds.

While specific suitable nonionic, cationic, and anionic surfactants have been set forth, the surfactants which may be used in the present invention area not limited to these specifically discussed. The present invention describes a process which uses surfactants which are either non-hazardous or, are biodegradable. Experiments have indicated that the preferred surfactants employed in the process of the present invention under desirable biological conditions are remarkably benign.

While many surfactants have been set forth above, the criteria for selection using a simple test well known to those skilled in the art are to select surfactant combinations which will 1) attract the particular oil or hydrocarbon to be cleaned, and 2) will, upon exposure to foam forming conditions, create a foam. This is easily done in a beaker or simple laboratory apparatus which is well known to those skilled in the surfactant art. While not necessarily known to those engaged in environmental remediation operations, those who design such operations have the information available once the description of this invention is made known to them. The preferred embodiments of this invention involve the selection of from about $C_9$ to about $C_{18}$ alcohol ethoxylates wherein the alkanol contains from about $C_9$ to about $C_{18}$ and an average of from about 6 to about 10 mols of ethylene oxide. Because of the environment in which the invention is to be practiced, a suitable antifreeze such as ethanoyl or ethylene glycol is included. Component A, the foaming surfactant component of the remediation system of this invention, also would include a latent foaming agent which produces a foam either when contacted with an activator or causes a foam to be produced when it comes into contact with components of the hydrocarbon spilled or various naturally occurring materials in the vicinity of the spill or the substrate.

Preferred latent foam forming agents are sodium bicarbonate, sodium carbonate, calcium peroxide, and the like. These are well known gas generating agents which through the release of gas, commonly carbon dioxide, will cause the surfactant water and oil materials all together to foam, forming a matrix and trapping the oil therein.

As a specially preferred embodiment, the constituents of Component A of this oil spill recovery system are set forth below in Table I.

TABLE I

| Component A | Parts By Weight (Preferred) | Parts By Weight (Especially Preferred) |
| --- | --- | --- |
| $C_9-C_{11}(OCH_2CH_2)_6OH$ | 15–25 | 20 |
| $C_{12}-C_{16}(OCH_2CH_2)_7OH$ | 12–17 | 15 |
| Ethyl Alcohol (Ethanoyl) | 8–12 | 10 |
| N-bis (hydroxyethyl) cocoamide | 8–12 | 10 |

As a preferred mixture, from about 5 to about 25, most preferred about 10, parts by weight of sodium bicarbonate is added to this surfactant mixture which is placed in solution with the surfactant mixture which is used as the A Component.

The second stream which would be used, if the latent foaming agent requires a chemical reaction for foam producing conditions, which contains a solution including the activator for the foam to capture the hydrocarbon in the matrix. With respect to one of the carbonate materials, an acid activator would be satisfactory with acidic acid preferred because of its ecologically benign nature. Other acids, of course, could be used, but mineral acids form inorganic salts and higher organic acids would produce water and soluble materials. The preferred acetic acid in Component B would be present in an amount from about 4% to about 10% by weight in water. Of course, if needed, an antifreeze should be present. An especially preferred Component B would include about 5% acetic acid. The amount of Component B can be determined by visually observing the degree of foaming and by adding greater or lesser amounts to contact the substrate, the contaminant and the latent foaming agent.

As seen above, Component A which as applied to the spilled oil is comprised of an organic substance, fatty acid esters, and one chemical of a two reactant foamforming reaction. The organic substance is used to lower the viscosity of the oil and to form an emulsion with the oil. The esters are involved in that reaction as well, providing emulsification, and as part of the temporary matrix structure (with the oil) of the foam. Component B consists of the other foam-forming reactant and water as the carrier vehicle. As was true with the surfactants employed in the process of the present invention, a combination of Component A and Component B is environmentally benign.

Tests of the especially preferred embodiments of Components A and B confirm that they are environmentally benign and constitute no hazard to aquatic life or plants. Extensive testing using widely respected and relied upon tests demonstrate such safe nature of the materials.

While not wishing to be constrained by theory, it is believed that lifting of the slightly modified crude or refined oil results from an inert gas being evolved and foaming that occurs on the oil surfaces. The foam life is normally 20 or more minutes in duration and depends on ambient temperature, wind velocity, and micro-terrain characteristics. Foam life is also dependent upon the relative amounts of the two chemical solutions (Component A and Component B) applied to the oil surface. The surface of the oil and the lifting product rises to temperatures of from about 60° F. to about 80°

F., depending upon climatic conditions and the natural or man-made substrates present. As discussed above, removal of the foamed oil from the environment is accomplished using normal industrial vacuum equipment or any other convenient removal equipment such as scoops or screens and the like. The foam and associated debris can be transported by vacuum for 100 feet or more depending upon the size, design, and power applied to operate the system. Systems with these characteristics are commercially available and are well known in the art. In fact, suitable vacuum equipment are currently being used to picked up debris both on and offshore during oil spill remediation operations as well as in normal liquid removal.

The equipment used to spray the two components in the system shown in FIG. 1 may take advantage of a standard pressurized water spray pumping system to allow control between Component A and Component B by the operator such that either simultaneous or sequential spray of the A and B Components may be selected to best lift the contaminant from the substrate. For example, the A Component can be sprayed to penetrate the contaminant at the surface prior to applying the activator for the foaming agent to lift it from the surface and capture it in the matrix of the foam prior to removal by vacuum. The nozzles on the spray equipment, each attached to barrels arranged in vertical alignment with each other, are adjustable such that the coverage and impact force can be varied.

Not only is the impact and coverage varied through the adjustment of the nozzle, the pressure can also be varied to accommodate the characteristics of the substrate upon which the spill occurs. For example, if the spill occurs on a relatively uniform piece of ice, then the open fan configuration would suffice. If the spill occurs on gravel, sand or fractured ice and water, it may be necessary to apply the A component prior to the B component in a manner where high pressure is used to drive the foaming surfactant and latent foaming agent into the interstices of the substrate such that it invades the spilled hydrocarbon to cause a reduction in viscosity and to allow for contact of the A component and, thus, to be lifted to the surface once the surfactant and contaminant are foamed together wherein the contaminant is trapped in the matrix of the foam. This allows for more convenient removal of the contamination. When the broad fan or cone-like coverage is used, it is not necessary that the pressure be overly high and, indeed, the pressure in such operation is from about 100 psi to about 800 psi. If it becomes necessary to drive the solutions into the substrate, an effective pressure, usually from about 600 psi to about 1,500 psi would be used. The preferred pressure range for operating the clean-up method of this invention, except for the most simple cases where only surface contamination has occurred, is from about 600 psi to about 1,000 psi.

Figure 2A:
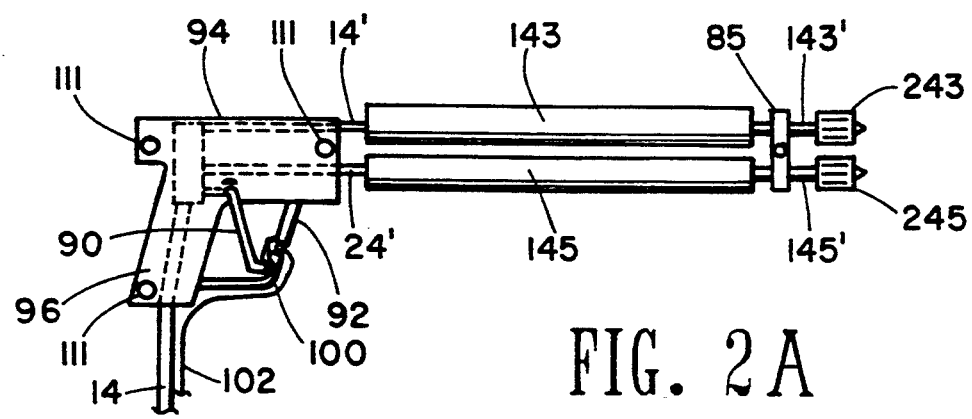
FIG. 2A is a side view of the preferred spray nozzle arrangement in an embodiment of the present invention showing two spray barrels in an over-and-under configuration.
Figure 2B:
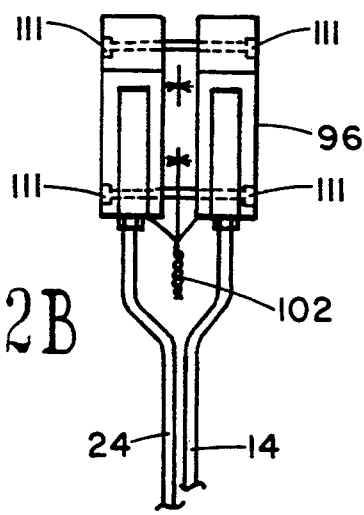
FIG. 2B is a rear view of the spray equipment of FIG. 2A showing the side-by-side orientation of the solution manifolds.
Figure 2C:
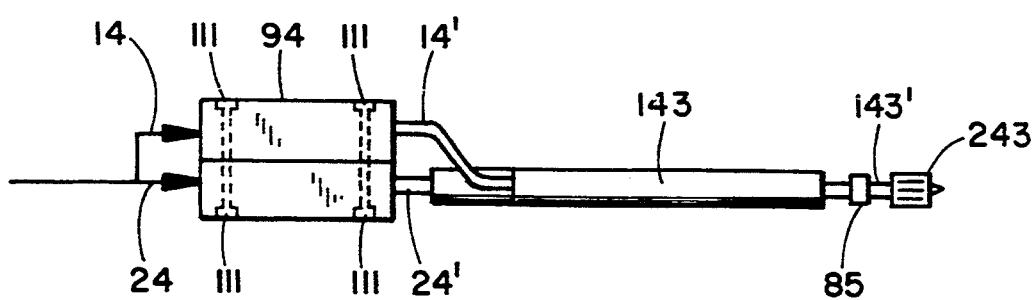
FIG. 2C is a top view of the spray equipment of FIG. 2A, It is to be noted that the drawings illustrate only typical embodiments of the invention and are therefore not to be considered limiting of its scope, for the invention will admit to other equally effective embodiments.

Referring now to FIGS. 2A, 2B, and 2C, there is shown a side, rear, and top view, respectively, of the spraying equipment of the present invention. As discussed before, pump 33 or other suitable pump, delivers Component A from tank 10, line 12 and through line 14 toward the spray gun 43. Likewise, electric pump 35 delivers Component B from tank 20, line 22 through line 24 towards the spray gun 45. Lines 14 and 24 are shown entering the gun near the handle grip 96. The components flow through lines 14 and 24 through the handle 96 and through the manifold of the gun. The handle 96 and manifold 94 of the gun are held in place by bolts 111. As seen in FIG. 2A, the gun has a trigger guard extending from the base of the gun stock 94 to the bottom of the gun grip 96. One of the triggers 90 is shown. When the triggers 90 and 90' are engaged, two low voltage micro switches 100 send a signal through low voltage wires 102 toward the pumps 33 and respectively. Component A flows through line 14 through the grip 96 through the manifold 94, and through line 14' into the insulated sleeve of barrel 143. From there, Component A exits the gun through 43' and the spray nozzle 243.

In a similar fashion, pump 35 delivers Component B through line 24 through the grip 96 and the manifold 94 and on through line 24'. Component B then flows through the insulated sleeve of barrel 145, through 145', and then through the spray nozzle 245. Barrels 143 and 145 are held together by barrel clamp 85.

While any pumping system designed to deliver two solutions may be used, the preferred hardware that is used for applying the chemical mixtures to a spill requires two standard car wash guns, both modified to suit the intended purposes of the present invention. Standard or custom-made nozzles can be used to provide variable or adjustable spray allowing the liquids to be applied onto the contaminant area either in a fan type spray or to impinge upon the fluids with a stream type spray. The fan type spray allows the operator to cover a larger area at one time and also is more efficient when applying the chemical mixture on frozen surfaces or solid grounds of all types. The fan type spray also requires less pressure and thus less movement of the contaminant while spraying occurs. On the other hand, the stream type spray allows for deep penetration into the substrates such as the gravel on a beach blackened with spilled crude oil. The pump pressure can be increased to provide a strong stream type spray to penetrate standing water or foliage.

Wash guns of short barrel length are preferred to allow for ease in handling and for directing the chemical mixture to its target. The barrel of one gun is modified to allow it to be installed on the top of the other gun barrel and then clamped at the end next to the nozzles. The pistol grips are bolted together side by side using long through bolts. As such, it appears as an over-and-under type shotgun. Standard micro switches (24 volt) are installed in the trigger guard, one in each guard, to operate in response to movement of its respective trigger. By installing the micro switches, this allows the use of one gun or both guns to operate independently or as a pair by the operator. When the trigger, or triggers, are pulled, the pumps start and deliver fluids to the appropriate gun or guns. As a particular advantage, the pumps only run when commanded by pulling the trigger or triggers, which eliminates continuous operation of the pumps. This saves the wear on the pumps.

Standard piston type pumps are employed to deliver the chemical components to the work place having available pressure ranges from about 200 psi to about 3,000 psi of pressure. Such a broad range of pressures is desirable, as each cleanup task requires multiple pressures and are site, and often contaminant, specific. The pressure may be varied according to instructions from the equipment manufacturer and is not unique for application to this invention.

Should immediate foaming not be as desired, such as when some presoak with the surfactant is desired, the B-Component trigger is released while the A-Component trigger is operated until the oil and substrate is wetted at which time the Component B trigger is squeezed to operate both guns at once, or the A-Component application is terminated. The mess then foams to trap the contaminants within the foam matrix. Application is terminated and the foam matrix containing the spilled oil may then be vacuumed. The flow rate of the component is dictated by the substrate and the degree of difficulty in containing the spilled contaminant.

The following examples are introduced to illustrate further the novelty and utility of the present invention, as well as the best way the inventor knows to practice it, but not with the intention of limiting the same, but to help others practice same.

EXAMPLES

A pilot scale spilled oil recovery system was constructed consisting of two chemical tanks holding the separate formulations for Component A and Component B (as schematically demonstrated in FIG. 1). These components were simultaneously pumped through parallel pressures hoses and shot through paired spray guns. In this instance, the components were combined in the air in front of the gun's nozzles and foamed upon contact with the contaminating crude oil.

The pilot system's two chemical holding tanks were plastic drums (ACT Poly-Drum), each of which was marked with quarter-gallon graduations to allow measurement of the amount of contents expended. The two piston pumps used to deliver the compounds to the guns produce between 650 and 800 psi. Each is a single phase Baldor one horsepower pump. The guns were modified commercial carwash units with micro switch triggers. Separate triggers on each gun allowed the operator to control the relative mix of the compounds.

Tests were conducted on a block of ice formed in a plastic Trayco Aero Tote container (manufactured by Tramco Company of Tuwalatin, Oregon) with a clear polyethylene liner. It had been filled with water to within about 6 inches of the top and frozen prior to the test date. The container with ice had been stored in the open air in Anchorage, Alaska, where it had been subjected to differential freeze/thaw cycles. This made the surface of the ice (which measured 34.5 inches by 32 inches) rough and irregular, which more closely approximated field conditions. The ice surface was cleaned with a wet/dry shop vacuum (12-gallon Shop Vac wet/dry vacuum with a 1.5 horsepower peak capacity pump before beginning the test.

Tests 1 and 2 were run in the following sequence: (1) a measured amount of crude oil was poured onto the block of ice, (2) Component A and Component B were simultaneously sprayed on the oil, (3) the resulting foam was vacuumed from the surface, (4) the contents of the vacuum receiver tank were transferred to a calibrated container, (5) the fluids in the container were allowed to stand for 24 hours for outgassing and phase separation into oil and water fractions, and (6) the amount of oil in the container was measured. Knowing the amount of oil added and removed provided the means to roughly calculate a recovery efficiency.

Test No. 1

Approximately 0.5 gallons of water was poured into the test container so that the oil would float on the surface of the ice. Six liters (1.6 gallons) of North Slope crude were poured into the test container, completely covering the ice. The cover ranged from a surface film to puddles more than one inch deep. Following the above procedure, Component A and Component B using the especially preferred formulation of the present invention in Table I above were then applied. The mass formed immediately and the resultant oil/foam mixture was vacuumed off the ice with the shop vacuum apparatus. The oil/foam mixture was subsequently transferred to a glass jug marked in ¼ gallon graduations. The Shop Vac tank was scraped with a rubber kitchen spatula to remove as much of the mixture as possible. Approximately 50 to 70 milliliters were inadvertently spilled during this test. The mixture was stored in the uncovered glass jug for 24 hours to allow outgassing of the expended chemical mixture, after which the volumes of recovered crude oil and water were recorded. Information recorded during Test No. 1 is reported in Table II.

Following the test, the ice surface was vigorously wiped with sorbent pads. They showed almost no presence of oil indicating that the chemical mixture had successfully removed essentially all oil from the surface, leaving it relatively oil free and clean.

Test No. 2

Six liters (1.6 gallons) of Cook Inlet crude was applied to the ice in the test container, covering about one-half the ice with a film ranging from 0.5 inches to 1 inch deep. Components A (Table I) and B (5% acetic acid) were then applied as described, following which the resultant oil/foam mixture was vacuumed off the ice. As in Test No. 1, the mixture was then transferred to glass jug marked in ¼ gallon graduations. The Shop Vac tank was scraped with a rubber kitchen spatula to remove as much of the mixture as possible. The oil/foam mixture was stored in the uncovered glass jug for 24 hours to allow outgassing and collapse of the foam, after which the volume of recovered crude and water were recorded. Information recorded during Test No. 2 is also reported in Table No. II.

Following the test, as before, the ice surface was vigorously wiped with sorbent pads. They showed almost no presence of oil indicating that the chemical mixture had successfully removed essentially all oil from the surface.

TABLE II

| CONDITIONS FOR THE TEST | Test No. 1 North Slope Crude | Test No. 2 Cook Inlet Crude |
| --- | --- | --- |
| Oil Volume in Gallons | 1.6 | 1.6 |
| Added Water in Gallons | 0.5 | 0 |
| Component A in Gallons | 0.50 | 0.50 |
| Component B in Gallons | 0.63 | 0.25 |
| Total Agent Volume in Gallons | 1.13 | 0.75 |
| Ambient Temperature in °Celsius | 16 | 15 |
| Spraying Time in Seconds | 15.02 | 10.40 |
| Vacuum Time in Minutes | 3.52 | 3.74 |
| Recovered Crude in Gallons | 1 | 1.5 |
| Percent Recovery | 62.5 | 93.8 |

Even though the observed recovery efficiency was different, the ice surface following both tests was essentially free of oil, as shown by scrubbing with clean sorbent pads.

As indicated earlier, laboratory measurements revealed that the application of the foaming agent lowers the viscosity of the spilled oil but otherwise had essentially no effect on other properties of the oil.

The above embodiments are given by way of example of the present invention and are not intended as limitations as further embodiments and advances will occur to those of skill in the art which practice the present invention.

What is claimed is:

1. A method for rapid oil spill cleanup from a substrate which comprises the steps of:
    spraying a first solution containing a foaming surfactant and a latent foaming agent to wet the spilled oil and contaminated substrate;
    contacting the wetted oil and substrate with a second solution containing an activator for the latent foaming agent for a period of time effective to induce foaming to form a foam matrix to entrap the oil in the matrix; and
    removing the foam containing the trapped oil from the substrate.

2. The method of claim 1 wherein the first and second solutions are sprayed simultaneously.

3. The method of claim 1 wherein the first solution is sprayed prior to the second solution to presoak the substrate and lower viscosity of the spilled oil prior to contacting with the foam activator.

4. The method of claim 1 wherein the second solution is an aqueous acid solution.

5. The method of claim 4 wherein the aqueous acid solution contains from about 4% to about 10% acetic acid.

6. The method of claim 1 wherein the foaming surfactant is a blend of nonionic, anionic, cationic, or amphoteric surfactants selected to be sufficiently lyophilic with the oil to hold said oil in the foam matrix when formed.

7. The method of claim 6 wherein the foaming surfactants are nonionic surfactants formed by reaction of an average of from about 6 to about 10 mols ethylene oxide per mol of an alkanol having from about 9 to about 18 carbon atoms.

8. The method of claim 6 wherein the blend of surfactants comprises a polyethoxyoctylphenol or a polyethoxynonylphenol containing an average from about 4 to about 12 ethylene oxide units per mol initiator with another surfactant.

9. The method of claim 6 wherein the blend of surfactants comprises an adduct of a fatty acid or an amine with a polyethoxy phenolic compound with another surfactant.

10. The method of claim 6 wherein the blend of surfactants comprises a quaternary ammonium chloride of a polypropoxy tertiary amine.

11. The method of claim 6 wherein the blend of surfactants comprises octylphenoxypolyethoxyethyl phosphate.

12. The method of claim 5 wherein the foam activator agent comprises about 5% acetic acid in water.

13. A method of removing crude oil from a frozen substrate in an arctic climate comprising:
    spraying a foaming surfactant on the oil at a pressure from about 100 psi to about 800 psi, said surfactant comprising the mixture
    15–25 parts by weight $C_9$–$C_{11}(OCH_2CH_2)_6OH$,
    12–17 parts by weight $C_{12}$–$C_{16}(OCH_2CH_2)_7OH$,
    8–12 parts by weight ethanol, and
    8–12 parts by weight of N-bis (hydroxyethyl) cocoamide,
    to which from about 5 to about 25 parts by weight of sodium bicarbonate foaming agent is added in an aqueous solution of from about 60% to about 85% volume of said surfactant mixture;
    spraying a foam inducing agent at a pressure from about 600 psi to about 800 psi for a period of time effective to induce foaming to create a foam matrix to entrap the oil, said agent comprising
    from about 4% to about 10% acetic acid in water; and
    vacuuming the foam containing the entrapped oil from the substrate.

* * * * *